May 2, 1967 — L. P. MARKS — 3,317,044
WATER CONDITIONING APPARATUS
Filed Dec. 2, 1964

INVENTOR.
LAWRENCE P. MARKS
BY
Andrus & Starke
ATTORNEYS

3,317,044
WATER CONDITIONING APPARATUS
Lawrence P. Marks, Brown Deer, Wis., assignor, by mesne assignments, to Culligan, Inc., Northbrook, Ill., a corporation of Delaware
Filed Dec. 2, 1964, Ser. No. 415,233
6 Claims. (Cl. 210—96)

This invention relates to a water conditioning apparatus, and more particularly to a water softener tank construction designed to provide a complete and even flow of water through the resin bed.

The present tank designs for water softeners are a consequence of the manufacturing limitations of steel fabricating processes and a carry-over of these designs to plastic tank construction. The conventional tank design does not adequately utilized the inherent capacity of the expensive ion exchange resin which is the working media located within the tank and which performs the softening function. For example, one conventional type of tank construction employs a concave or semi dish-shaped bottom head and a screen distributor is located above the bottom head at the center of the tank. The service water flow is down through the resin bed, and the water is discharged through the distributor. In some cases a bed of stone chips are located on the bottom head to support the resin bed and function as a distributor.

In this conventional tank design the water flow leaves pockets of resin at the lower corners of the tank. These resin pockets remain undisturbed even on reverse flow or backwash and serve only to support the working resin. In addition the brine used in the regeneration of the resin tends to become trapped in the stagnant resin pockets and is not thoroughly removed during the rinse cycle. In service some of this brine may pass into the water system.

The present invention is directed to a water softener tank construction which provides a complete and uniform flow of water through the resin bed and eliminates unused pockets of resin. More specifically, the lower head of the tank is in the shape of a paraboloid and an inverted cone-shaped distributor is located centrally of the bottom head. The cone-shaped distributor is formed with upwardly and outwardly diverging inner and outer walls, both of which are provided with a series of generally horizontal slits or openings.

In service all of the resin is exposed to the flow of water for the water flows downwardly through the resin bed and is directed toward the distributor by the parabolic head. When the flow of water is reversed for backwashing the resin prior to regeneration with brine, a complete expansion and thorough cleaning of the entire resin bed results. Further, when the resin is regenerated by passing brine through the bed, all the resin is exposed, resulting in maximum regeneration of the resin.

The complete utilization of the regenerated resin for softening and the complete removal of the brine is particularly important when electrode conductivity sensors are located in the resin bed to automatically initiate softener regeneration based on the resin condition. Pockets of unregenerated resin or residual brine can falsely signal an unwanted regeneration of the resin resulting in erratic and wasteful operation. These problems are eliminated by use of the water softening tank construction of the invention.

Other objects and advantages will appear in the course of the following description.

The drawings illustrate the best mode presently contemplated of carrying out the invention.

Figures 1, 2, 3:
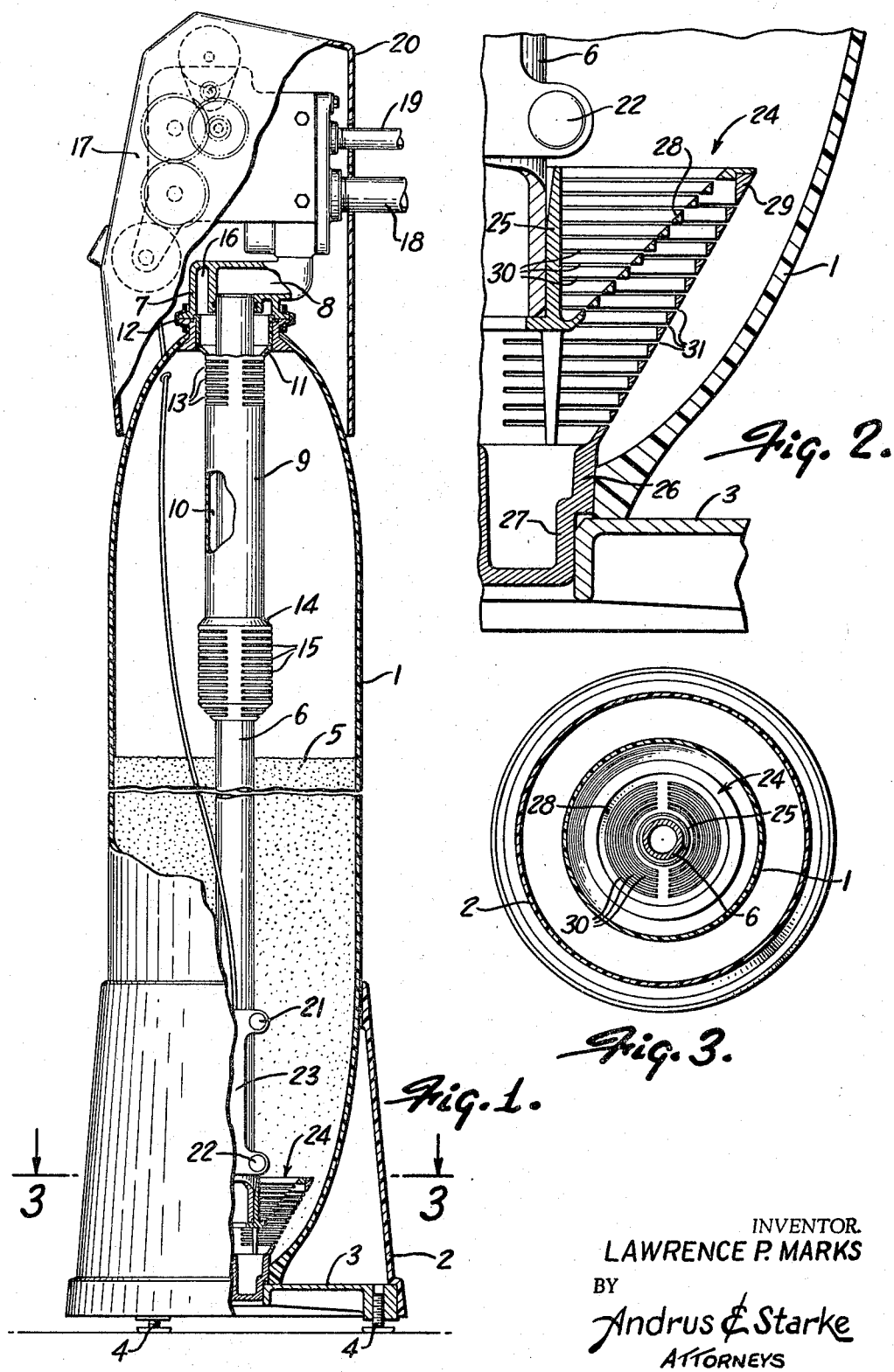
FIG. 1 is a side elevation of a water softening tank with parts broken away in section.
FIG. 2 is an enlarged fragmentary vertical section showing the construction of the lower portion of the tank and the distributor.
FIG. 3 is a transverse section taken along line 3—3 of FIG. 1.

The drawings illustrate a water softener or other water conditioning apparatus which includes a tank 1 which is fabricated from fiber reinforced resin or other corrosion resistant material. The upper and lower ends of the tank are parabolic in shape while the central portion of the tank 1 is generally cylindrical.

The lower end of the tank 1 is mounted in a skirt 2 which extends downwardly and is secured to a base 3. The base is supported on the floor or foundation by a series of adjustable legs 4.

The tank 1 contains a bed of a conventional ion exchange resin and a tube 6 is located centrally of the tank and extends through the resin bed 5. The upper end of the tube 6 is secured within an opening in a fitting 7 and the tube communicates with a water passage 8 in the fitting 7. The upper half of the tube 6 is surrounded by a sleeve 9 which is spaced from the tube 6 to provide an annular passage 10 therebetween. The upper end of the sleeve 9 is enlarged and is secured within a flanged ring 11, and the upper flange on the ring 11 is attached to a corresponding flange on fitting 7 by a split ring coupling 12.

To provide communication between the interior of the tank 1 and the annular passage 10, the upper end of the sleeve 9 is provided with a series of slits 13. In addition, the lower end of the sleeve 9 is enlarged as indicated by 14 and the enlarged section is provided with a series of slits 15 which also provide communication between the passage 10 and the interior of tank 1. The upper end of the passage 10 communicates with a passage 16 formed in fitting 7.

A conventional valve mechanism 17 is mounted on the fitting 7 and serves to direct the flow of water into the passages 8 or 16 in fitting 7 in accordance with the preselected cycling of the water softener. Water is supplied to the valve mechanism 17 through an inlet pipe 18 and is discharged from the valve mechanism through line 19. The valve mechanism 17 is contained within an outer casing 20.

A pair of electrode conductivity sensors 21 and 22 are mounted on a bracket 23 attached to tube 6 and serve to automatically initiate the regeneration cycle depending on the electrical conductivity of resin. The structure and action of the conductivity sensors 21 and 22 is similar to that described in the copending application Ser. No. 99,570 filed Mar. 30, 1961, now Patent No. 3,159,573, and entitled Resistance Sensing Probe System.

The lower end of the tube 6 is connected to a distributor 24. As best shown in FIG. 2, the distributor 24 is provided with an annular upstanding flange 25 and the lower end of tube 6 is located within the flange. The lower end 26 of the distributor 24 is secured within the central opening in the lower head of the tank 1 and, in addition, the lower extremity 27 of the distributor has a reduced diameter and is secured within an opening in the base 3.

As best shown in FIG. 2, the distributor is formed with an inner wall 28 and an outer wall 29 and both of the walls are provided with a series of generally horizontal slits 30 and 31. The walls 28 and 29 are both frusto conical and diverge upwardly and outwardly with the outer wall 29 conforming generally to the shape of the parabolic lower end of the tank 1. This combination of the parabolic tank head and the inverted frusto conical shaped distributor results in a hydraulic system which causes complete and even flow of water through the resin bed and eliminates all pockets of unused resin at the lower corners of the tank.

In service, water is introduced through the passage 16 into the passage 10 and flows through the slots 15 into the tank 1. The water then flows downwardly through the resin bed, along the parabolic lower head and through the slots 30 and 31 in the distributor 24. The water then flows upwardly through the central tube 6 to the passage 8. When the water flow is reversed for backwashing and expanding the resin prior to regeneration with brine, the water flows downwardly within the tube 6, outwardly through the slots 30 and 31 in the distributor, upwardly through the resin bed and is discharged through the slots 13 to the passage 16. The water flow during the brining cycle is similar to that with respect to the service cycle.

The combination of the parabolic head with the cone-shaped distributor provides a complete utilization of the regenerated resin for softening and results in a complete removal of all brine which is particularly important when electrode conductivity sensors such as 21 and 22 are used in the resin bed. With the use of the conductivity sensors, pockets of unregenerated resin or residual brine can falsely signal an unwanted regeneration cycle and this results in erratic and wasteful operation.

Various modes of carrying out the invention are contemplated as being within the scope of the following claims particularly pointing out and distinctly claiming the subject matter which is regarded as the invention.

I claim:

1. In a water conditioning apparatus, a tank having a generally parabolic shaped lower end, a bed of ion exchange resin disposed within the tank, a tube disposed centrally of the tank and extending through the bed of resin, and a distributor connected to the lower end of the tube and disposed at the parabolic end of the tank, said distributor having the shape of an inverted frusto conical shape and comprising an inner wall and an outer wall with the outer wall diverging upwardly and outwardly in conformity with the parabolic shaped lower end of the tank, said walls being provided with a series of openings providing communication between the interior of said distributor and the interior of the tank.

2. In a water conditioning apparatus, a tank having a generally parabolic shaped lower end, a bed of ion exchange resin disposed within the tank, a tube disposed centrally of the tank and extending through the bed of resin, and a distributor connected to the lower end of the tube and disposed at the parabolic end of the tank, said distributor comprising an inner inverted generally frusto conical wall and an outer inverted generally frusto conical wall with said walls being spaced apart to provide a passage therebetween, said passage communicating with the lower end of said tube, said inner wall and said outer walls both being provided with a plurality of openings establishing communication between said passage and the interior of the tank.

3. The structure of claim 2 in which the openings in the wall comprise a series of generally parallel horizontal slots.

4. The structure of claim 3, and including electrode conductivity sensing means disposed within the resin bed and responsive to the electrical conductivity of said bed for signalling a regeneration cycle.

5. The structure of claim 2, in which a central annular flange is connected to the inner wall of the distributor and the lower end of the tube is connected to the flange.

6. In a water conditioning apparatus, a tank having a generally parabolic shaped lower end and having an axial opening in said lower end, a bed of ion exchange resin disposed within the tank, a vertical tube disposed centrally of the tank and extending through the bed of resin, and a distributor connected to the lower end of the tube and disposed at the parabolic end of the tank, said distributor comprising an inner inverted generally frusto conical wall and an outer inverted generally frusto conical wall with said walls being spaced apart to provide a passage therebetween, said passage communicating with the lower end of said tube, said inner wall and said outer wall both being provided with a plurality of openings establishing communication between said passage and the interior of the tank, said distributor having a central upstanding flange disposed to receive the lower end of the tube and said distributor having a lower annular projection disposed in sealed relation within the central opening in said tank.

References Cited by the Examiner

UNITED STATES PATENTS

| | | | |
|---|---|---|---|
| 1,784,893 | 12/1930 | Duden | 210—289 X |
| 2,627,503 | 2/1953 | Anderson | 210—279 X |
| 2,973,097 | 2/1961 | Snider | 210—279 |
| 3,159,573 | 12/1964 | Ritchie | 210—96 |
| 3,174,623 | 3/1965 | Sloan | 210—289 X |

REUBEN FRIEDMAN, *Primary Examiner.*

D. M. RIESS, *Assistant Examiner.*